INVENTOR.
Albert Leyer
BY Michael S. Striker
Attorney

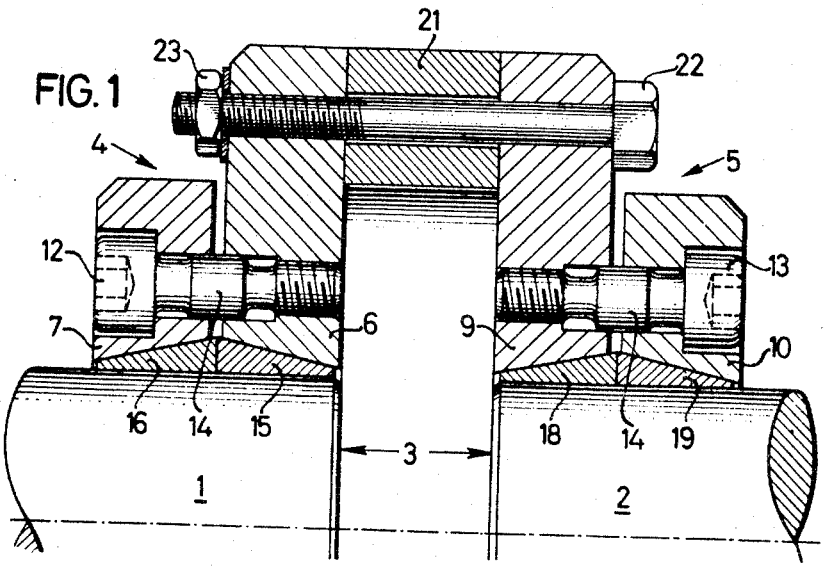
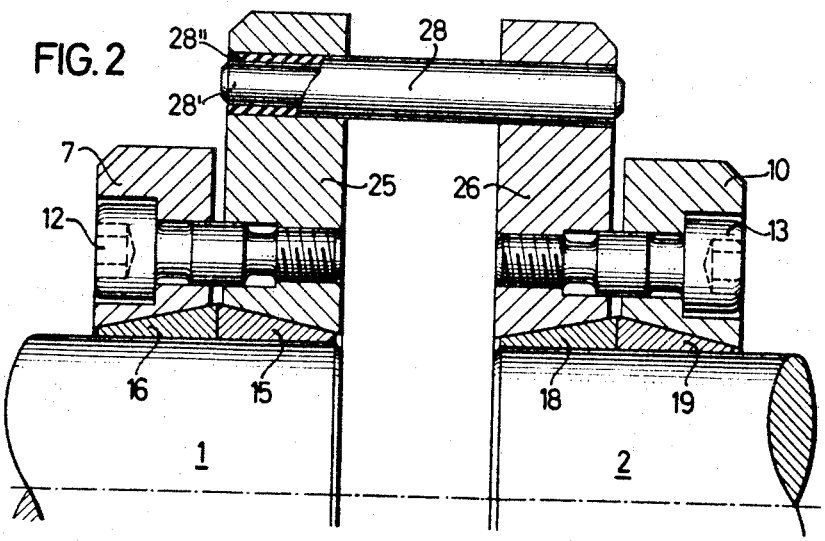

United States Patent Office 3,434,303
Patented Mar. 25, 1969

3,434,303
ARRANGEMENT FOR COUPLING SHAFTS
Albert Leyer, Ruschlikon, Zurich, Switzerland, assignor to Metallschlauchfabrik A.G., Lucerne, Switzerland
Filed Jan. 23, 1967, Ser. No. 611,125
Claims priority, application Switzerland, Jan. 26, 1966, 1,053/66
Int. Cl. F16d 3/00, 3/19, 3/52
U.S. Cl. 64—6                                                 18 Claims

ABSTRACT OF THE DISCLOSURE

An arrangement for coupling a pair of substantially aligned shaft end portions comprising a pair of boss means respectively mounted on each shaft end portion and force transmitting means between the boss means. Each of the boss means includes a pair of annular members pressed in axial direction toward each other and fixedly connected through conical ring means to the respective shaft end portion. The force transmitting means are connected to one of each pair of annular members while the other annular member of each pair serves as additional means for transmitting a force from said one annular member to the respective shaft end portion.

Background of the invention

The present invention relates to an arrangement for coupling a pair of substantially aligned shaft end portions with each other, in which a boss is connected to each of the shaft end portions and in which the two bosses are connected to each other by force transmitting means.

Various coupling arrangements of this type are known in the art. Known coupling arrangements of this type have the disadvantage that in order to mount the coupling arrangement on the opposite shaft end portions the latter have to be moved in axial direction away from each other at least for the width of the respective boss on each shaft end portion so that the shafts can be properly aligned with each other only after the bosses had been mounted on the ends thereof which will complicate proper alignment of the shafts. Furthermore, whenever the coupling means have to be removed, the shafts have again to be moved in axial direction away from each other which in turn will later on require a new alignment of the shafts.

An additional disadvantage of known coupling arrangements for shafts is that in many such arrangements only relatively small forces can be transmitted through the coupling arrangement or that the various elements of the coupling arrangement have to be dimensioned to such large size so as to withstand the occurring forces, which in turn makes mounting and dismounting of the coupling arrangement even more complicated. In order to fixedly connect the coupling elements to the shaft ends, it is in many cases also necessary to machine the shaft ends to special configurations for instance to provide key grooves therein, which leads to a weakening of the shaft ends.

It is an object of the present invention to overcome the above disadvantages of coupling arrangements of this type known in the art.

It is an additional object of the present invention to provide for a coupling arrangement of the aforementioned type in which the various elements of the coupling arrangement are relatively small to permit easy mounting and dismounting of the coupling arrangement on the end portions of a pair of shafts to be coupled, in which preferably the mounting and dismounting of the coupling arrangement can be carried out without moving the shafts in axial direction and in which the various elements of the coupling arrangement are constructed so as to permit transmission of relatively large forces through the coupling arrangement.

It is a further object of the present invention to provide for a coupling arrangement which does not require special machining of the shaft ends.

Summary of the invention

An arrangement for coupling a pair of substantially aligned shaft end portions to each other mainly comprising a pair of conical rings fitted adjacent each other on each shaft end portion with the large diameter ends of each pair of conical rings facing each other, a pair of annular members having inner conical surfaces respectively mounted on the conical rings on each shaft end portion, axially extending screw means connecting the annular members of each pair to each other so that by tightening the screw means the inner conical surfaces of the annular members will be tightly pressed against the outer surfaces of the conical rings and the latter will be tightly pressed against the respective shaft end portions to secure the rings and annular members against movement relative to the shaft end portions, and force transmitting means between one annular member on one shaft end portion and one anular member on the other shaft end portion, whereby the other annular member on each shaft end portion forms an additional means for transmitting of forces from the one annular member to the respective shaft end portion.

The shaft end portions are preferably axially spaced a given distance from each other and the rings, the annular members and the force transmitting means are constructed and arranged with respect to each other to be mounted and removed from the shaft end portions while maintaining the axial spacing of the latter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Brief description of the drawing

FIG. 1 is a partial axial cross section of a rigid coupling arrangement according to the present invention;

FIG. 2 is a partial axial cross section through a second embodiment according to the present invention and showing a flexible coupling arrangement;

Description of the preferred embodiments

Figure 3:
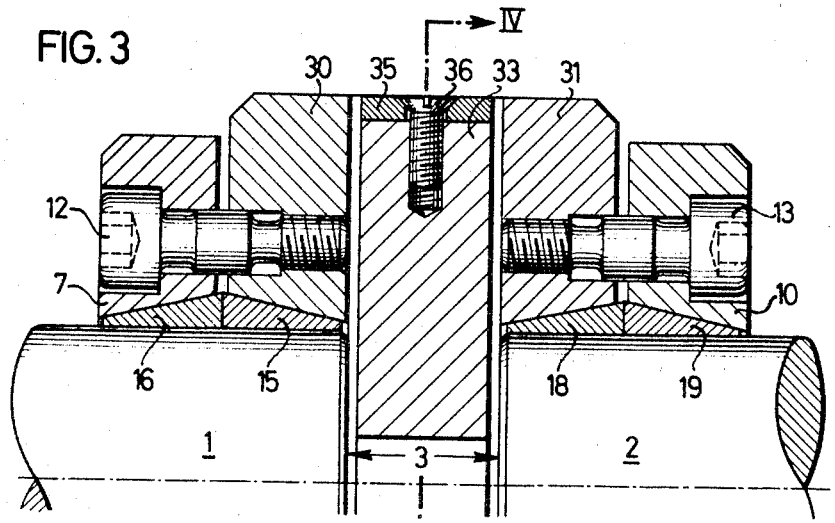
FIG. 3 is a partial axial cross section through a third embodiment.

Referring now to the drawing, and more specifically to FIG. 1, it will be seen that the coupling arrangements illustrated in this figure includes a pair of boss means 4 and 5 respectively mounted on shaft end portions 1 and 2, the facing ends of which are spaced a distance 3 from each other. The boss means 4 comprises two annular members 6 and 7, arranged slightly spaced in axial direction from each other about the shaft end portion 1, and the boss means 5 comprises likewise two annular members 9 and 10 arranged axially spaced slightly from each other about the shaft end portion 2. The width of each of the aforementioned annular members is slightly smaller than the distance 3 between the facing ends of the shafts so that each of the annular members may be placed through the space 3 on the respective shaft end portion. The annular members 6 and 7 are connected to each other by a plurality of screws 12 respectively extending through bores in the annular members 6 and 7 and uniformly distributed about the axis of these annular members. The annular members 9 and 10 are likewise connected to each other by a plurality of screws 13. Only one of the screws 12 and 13 is shown in FIG. 1, but it is understood that the arrangement includes a plurality of such screws uniformly distributed about the axes of the respective members. Each of the screws 12 and 13 has between its head and its threaded end portion a cylindrical portion 14, tightly fitting in the respective bores of the two annular members which the respective screw connects and forming torque transmitting means between the two annular members. The boss means 4 include further a pair of conical rings 15 and 16, fitted on the shaft end portion 1 in such a manner that the large diameter ends of the two conical rings 15 and 16 abut against each other. The annular members 6 and 7 have inner conical surfaces respectively engaging the outer conical surfaces of the rings 15 and 16. The boss means 5 includes likewise a pair of conical rings 18 and 19 arranged with respect to each other and with respect to the annular members 9 and 10 in the same manner as the conical rings and annular members of the boss 4 are arranged with respect to each other. The conical rings 15, 16, 18 and 19 are preferably split rings and it is evident that by tightening the screws 12 and 13 the inner conical surfaces of the respective annular members will be tightly pressed against the outer conical surfaces of the respective conical rings and the latter be tightly pressed against the respective shaft end portions so that the annular members are fixedly connected to the respective shaft end portions.

In the arrangement shown in FIG. 1, the annular members 6 and 9 which face each other have larger outer diameters than the annular members 7 and 10 which face away from each other, and the force or torque transmitting means in this arrangement comprise a plurality of axially extending screws 22, only one of which is shown in FIG. 1, which respectively extend through aligned axial bores uniformly spaced from each other and respectively formed in the outer portions of the annular members 6 and 9. Preferably, a ring member 21 of an outer diameter substantially equal to the outer diameters of the annular members 6 and 9 is sandwiched between the latter and the screws 22 extend also through corresponding bores of the ring member 21. Each of the screws is tightened by a nut 23 threadingly connected to the threaded end of the respective screw.

Since the annular members 6, 7, 9 and 10 as well as the conical rings 15, 16, 18 and 19 can be placed on the respective shaft end portion through the gap 3 between the shaft ends, the arrangement illustrated in FIG. 1 has the advantage that the shaft ends may be aligned before the various coupling elements are placed thereon and that the coupling may be mounted and dismounted wihtout requiring movement of the shaft ends and any apparatus connected thereto in axial direction.

In the above described arrangement the annular members 6 and 9 which face each other are constructed as carriers of the force transmitting means, that is the screws 22 and the ring member 21. The other annular member of each pair, that is the annular members 7 and 10, not only serve to properly clamp the respective boss by means of the conical rings onto the respective shaft end portions, but the other annular member serves also to increase the adhesion of the respective boss to the respective shaft end portion. Since the width of each annular member is relatively small so that the annular members may be placed through the gap 3 on the respective shaft end portions, the adhesion surface of each annular member is relatively small. However, by connecting two annular members in parallel to each other on each shaft end portion by means of the screws 12 and 13, a coupling arrangement is obtained which permits transmission of relatively large forces from one to the other shaft. The force is transmitted from the shaft 1 through the annular member 6, the screws 22 to the annular member 9, and from there to the shaft 2, and parallel thereto the force is also transmitted from the shaft 1 through the annular member 7, the screws 12 to the annular member 6, and from there through the screws 22 to the annular member 9, from where the force is also transmitted by the screws 13 to the annular member 10, and from the latter to the shaft 2.

The coupling arrangement according to the present invention permits therefore to transmit relatively large forces between two shafts while greatly facilitating mounting and dismounting of the coupling arrangement.

FIG. 2 illustrates a second embodiment of a coupling arrangement according to the present invention, which differs from the above described embodiment only by the construction and arrangement of the force transmitting means between the bosses on the two shaft ends. Instead of a plurality of screws as shown in FIG. 1, the force transmitting means of the embodiment illustrated in FIG. 2 comprises a plurality of flexible pins 28, only one of which is shown in FIG. 2, which respectively extend with a press fit through aligned bores respectively formed uniformly spaced from each other through radially outer portions of the annular members 25 and 26, which face each other. Each of the pins 28 may be formed by an inner steel core 28' and an outer rubber sleeve 28", or each of the pins 28 may be formed entirely from rubber, to permit flexing of the pins 28 in the space between the annular members 25 and 26. The ring member 21 shown in FIG. 1, is omitted in the embodiment shown in FIG. 2.

Figure 4:
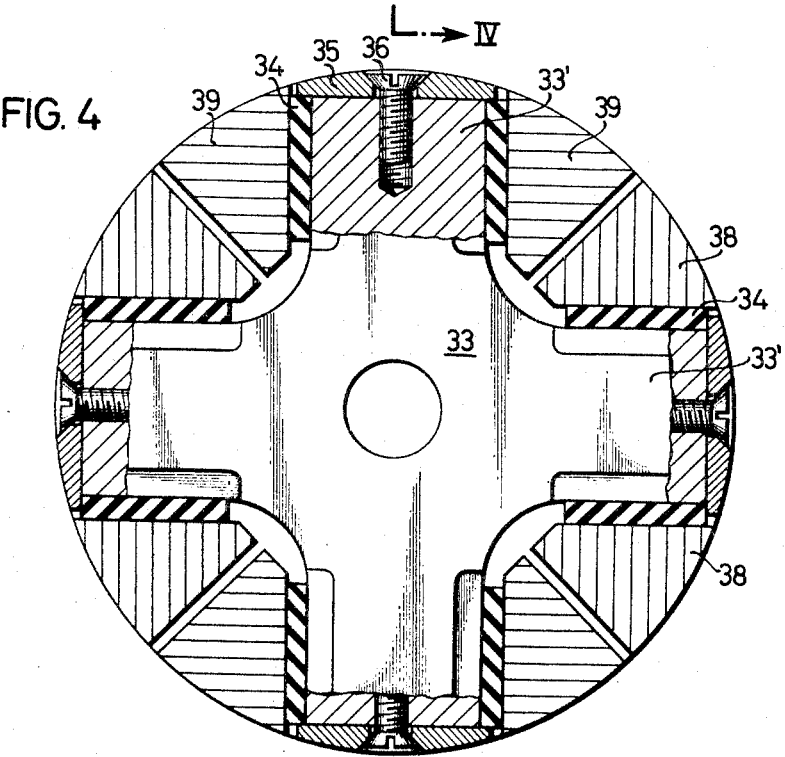
FIG. 4 is a transverse cross section taken substantially along the line IV—IV of FIG. 3.
Figure 5:
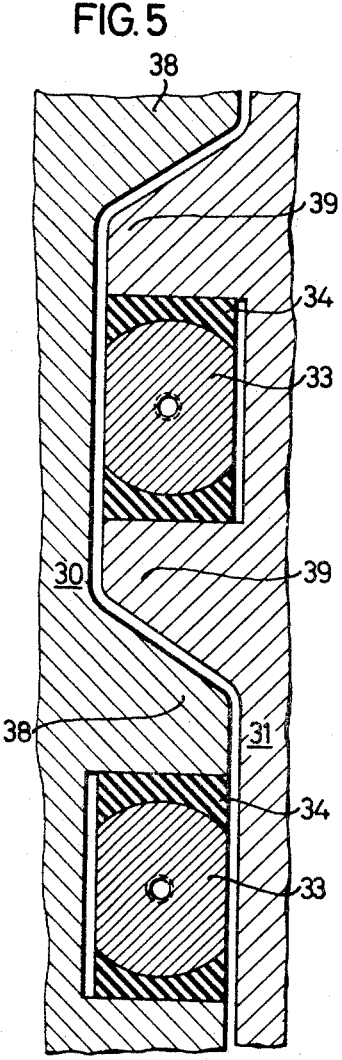
FIG. 5 is a partially developed annular cross section through a center portion of the embodiment shown in FIG. 3.

A further embodiment of a coupling arrangement according to the present invention is illustrated in FIGS. 3–5. The coupling arrangement illustrated in these three figures differs from the above described arrangements mainly by the construction of the force transmitting means and corresponding construction of the facing annular members between which the force transmitting means is arranged. The force transmitting means of the embodiment illustrated in FIGS. 3–5, comprises a cross-shaped connecting member 33 having four radial arms 33' respectively located in grooves formed in claws 38 and 39 integrally formed with the annular members 30 and 31, which face each other. The claws 38 integral with the annular member 30 are displaced through an angle of 90 degrees with respect to the claws 39 integral with the member 31. The side faces of the arms 33' are respectively spaced from the side faces of the grooves in which the arms are respectively located and insert layers 34, preferably formed of rubber or other resilient material, are sandwiched between side faces of the arms and side faces of the grooves. Preferably, the side faces of the arms are formed by cylindrical portions, as best shown in FIG. 5, and the corresponding faces of the insert layers 34 match the contour of the side faces of the arms, to thus facilitate coupling of two shafts which are not preferably aligned with each other. As likewise shown in FIG. 5, there is a certain clearance maintained between adjacent claws 38 and 39. Holding means, in form of plates 35, fixed by screws 36 to the outer ends of each of the arms 33' and extending with peripheral portions thereof over the insert layers 34 hold the latter in place against centrifugal forces they are subjected to during rotation of the shafts.

The axial length of each of the claws is shorter than the distance between the facing ends of the shafts 1 and 2, and it will be evident from the described construction, which includes, as clearly shown in FIG. 3, otherwise all elements of the coupling arrangement described in connection with FIG. 1, that the various elements of the coupling arrangement may be mounted on and dismounted from the shaft end portions 1 and 2, which are again spaced a given distance 3 from each other without moving the shafts in axial direction.

Figure 6:
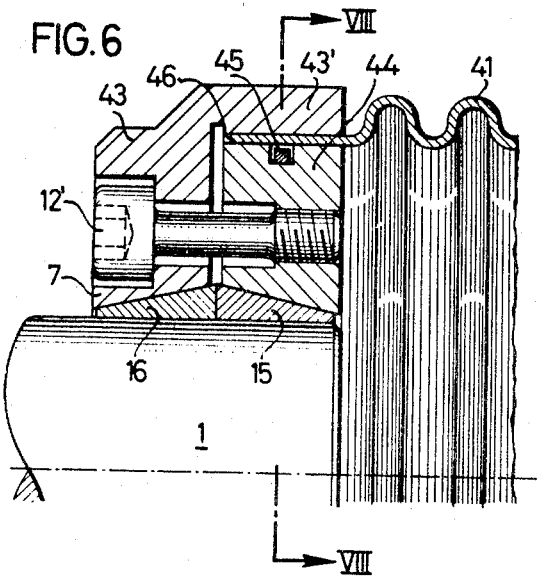
FIG. 6 is a partial axial cross section through a fourth embodiment.
Figure 7:
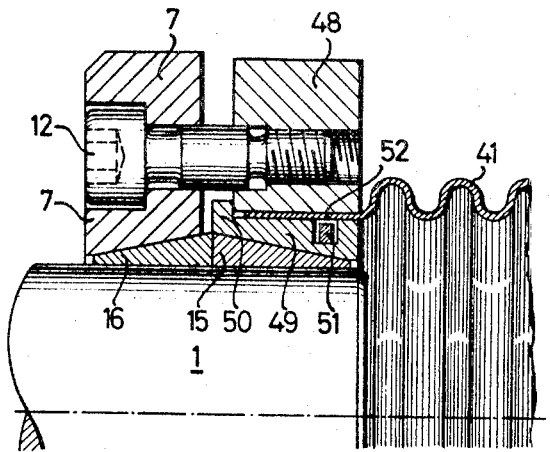
FIG. 7 is an axial partial cross section and showing a slight modification of the embodiment shown in FIG. 6.
Figure 8:
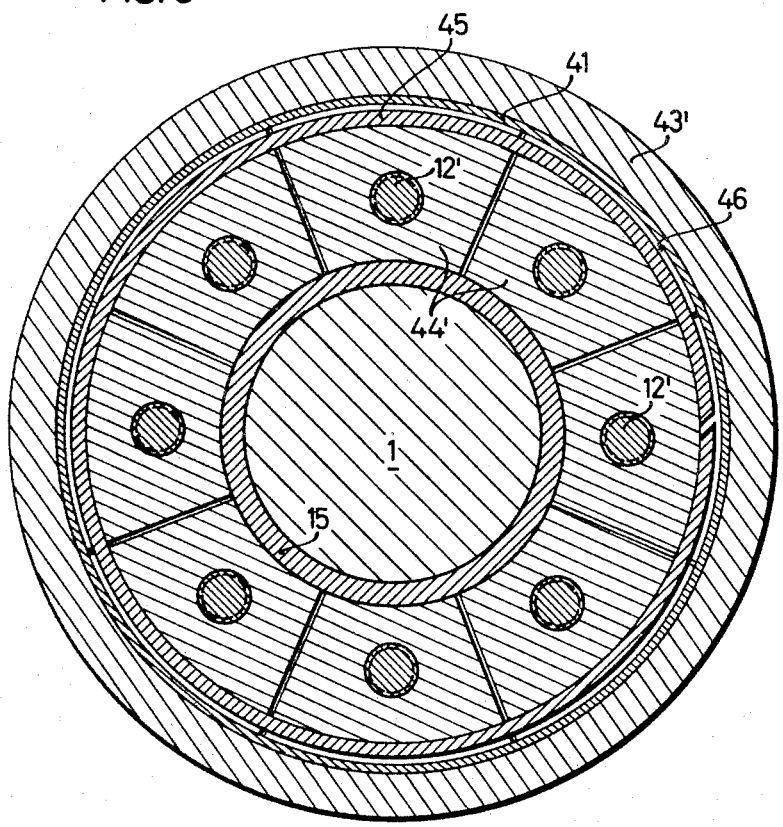
FIG. 8 is a transverse cross section taken along the line VIII—VIII of FIG. 6.

A further coupling arrangement according to the present invention is illustrated in FIGS. 6 to 8. These figures illustrate only one boss on the shaft end portion 1, but it is understood that the arrangement includes a second shaft end portion 2 and a corresponding boss arranged thereon. The force transmitting means in the arrangement illustrated in FIGS. 6–8 is constituted by an elastic corrugated tube 41. The elastic corrugated tube may be constructed as a single walled tube, as shown in FIG. 6, or as a multiple wall tube. As shown in FIG. 6, the coupling elements mounted on the shaft end portion 1 include an annular member 44, a second annular member 43, axially spaced therefrom and having an axially extending annular portion 43' extending over the outer periphery of the annular member 44 radially slightly spaced therefrom to define therewith an annular space 46. The two annular members 43 and 44 are again connected to each other by axial screws 12' respectively extending with a small clearance through aligned bores in the members 43 and 44 and screwed with threaded end portions in correspondingly threaded portions of the bores in the member 44. The annular members are clamped on the shaft end portion by means of conical rings 15 and 16 in the manner as described above.

During tightening of the screws 12, the annular member 44 is slightly expanded so as to clamp the cylindrical end of the corrugated tube 41 located in the annular space 46 between the outer peripheral surface of the annular member 44 and the inner peripheral surface of the axially projecting flange portion 43' of the annular member 43. In order to assure a uniform clamping of the cylindrical end of the corrugated tube 41, the annular member 44 is preferably divided by a plurality of radial cuts in individual sectors 44', as clearly shown in FIG. 8, which are held together by an annular spring 45, preferably in the form of a split ring, located in a corresponding groove in the sectors 44'. In this embodiment the force is transmitted from the member 44 to the member 43 mainly through the clamped end of the tube 41 and the flange 43' of the member 43.

The embodiment partly illustrated in FIG. 7, is similar to the last described embodiment and this embodiment includes likewise a corrugated tube 41 as a force transmitting means. In order to clamp the end of the elastic tube 41, the embodiment shown in FIG. 7, includes an additional conical ring 49 located between the annular member 48 and the conical ring 15 coordinated therewith. The additional conical ring 49 engages with its inner conical surface the outer conical surface of the conical ring 15, and has at its end facing the annular member 7 an annular rim 50 abutting against an end face of the annular member 48 which faces the annular member 7. The outer cylindrical surface of the conical ring 49 faces the inner cylindrical surface of the annular member 48 and defines therewith an annular space 52 in which the cylindrical end of the corrugated tube is located. It is evident that, during tightening of the screw 12 and corresponding movement of the ring 49 in axial direction, the radial distance between the outer cylindrical surface of the ring 49 and the inner cylindrical surface of the annular member 48 will be shortened and the end portion of the corrugated tube 41 will be tightly clamped between the aforementioned surfaces. Preferably, the ring 49 is formed by a plurality of ring sectors which are held together by an annular spring 51 located in corresponding grooves of the sectors in the same manner as shown in FIG. 8 for the sectors 44' of the annular member 44.

It is to be understood that the other end of the corrugated tube 41 illustrated in FIGS. 6 and 7 is clamped in similar manner on a corresponding shaft end portion opposite to the shaft portion 1 illustrated in FIGS. 6 and 7.

The advantage of the coupling arrangement shown in FIGS. 6 and 7 is that this coupling arrangement permits an adjustment in axial, lateral, radial and angular direction of two shaft end portions, while the arrangement has very small radial dimensions.

It will be understood that each of the elements described above, or two or more together, may also find a useful application in other types of coupling arrangements differing from the types described above.

While the invention has been illustrated and described as embodied in an arrangement for coupling a pair of substantially aligned shaft end portions to each other, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for coupling a pair of substantially aligned shaft end portions to each other comprising, in combination, ring means mounted on each shaft end portion and having each a pair of conical outer surfaces tapering toward the opposite ends of said ring means; a pair of annular members having inner conical surfaces mounted on each of said ring means with said inner conical surfaces of said pair of annular members respectively engaging said outer conical surfaces of said ring means; axially extending screw means extending through said annular members and connecting the annular members of each pair to each other so that by tightening said screw means the inner conical surfaces of said annular members will be tightly pressed against the outer conical surfaces of said ring means and the latter be tightly pressed against the respective shaft end portion to secure said ring means and said annular members against movement relative to said shaft end portions; first torque transmitting means between one of said annular members on one shaft end portion and one annular member on the other shaft end portion; and second torque transmitting means between the pair of annular members on each shaft end portion.

2. An arrangement as defined in claim 1, wherein said screw means comprise a plurality of screws respectively extending through aligned bores of each pair of annular members and wherein said second torque transmitting means are constituted by cylindrical portions of said screws tightly fitting in portions of said bores of said pair of annular members.

3. An arrangement as defined in claim 1, wherein said torque transmitting means are arranged between that annular member on one shaft end portion which faces one of said annular members on the other shaft end portion.

4. An arrangement as defined in claim 1, wherein said one annular member on one shaft end portion faces said one annular member on the other shaft end portion and is axially spaced therefrom and wherein said first torque transmitting means comprises a plurality of screws extending in axial directions through corresponding bores in said facing annular members and spacer means sandwiched between facing surfaces of said annular members.

5. An arrangement as defined in claim 4, wherein said spacer means are constituted by a ring member formed with a plurality of axially extending bores therethrough through which said plurality of screws respectively extend.

6. An arrangement as defined in claim 1, wherein said one annular member on one shaft end portion faces said one annular member on the other shaft end portion and is axially spaced therefrom and wherein said first torque transmitting means comprises a plurality of elastic bolts respectively tightly fitted at opposite ends thereof in corresponding bores in said facing annular members.

7. An arrangement as defined in claim 1, wherein said one annular member on one shaft end portion faces said one annular member on the other shaft end portion and is axially spaced therefrom, and wherein said first torque transmitting means comprises a connecting member having a plurality of radially extending arms located between said facing annular members and claw means integral with said facing annular members and respectively engaging said arms of said connecting member.

8. An arrangement as defined in claim 7, wherein said claw means comprise a plurality of claws on each of said facing annular members, with the claws on one of said facing annular members angularly displaced from the claws on the other of said facing annular members, and each of the claws being formed with a substantially radially extending groove, said arms on said connecting member being respectively located in said grooves with the side faces of said arms spaced from side faces defining said grooves, and including elongated insert layers respectively sandwiched between said side faces of said arms and corresponding side faces of said grooves.

9. An arrangement as defined in claim 7, wherein each of said ring means comprises a pair of conical rings fitted adjacent each other on the respective shaft end portion with the larger diameter ends of each pair of conical rings facing each other.

10. An arrangement as defined in claim 8, wherein said insert layers are formed from elastic material.

11. An arrangement as defined in claim 8 and including holding means connected to the outer ends of said arms and holding said insert layers in place between said faces.

12. An arrangement as defined in claim 1, wherein said one annular member on one shaft end portion faces said one annular member of the other shaft end portion and is axially spaced therefrom, and wherein said first torque transmitting means comprises an elastic tube connected to said facing annular members.

13. An arrangement as defined in claim 12, wherein said elastic tube is a corrugated tube.

14. An arrangement as defined in claim 12, wherein said second torque transmitting means comprises an annular portion axially projecting from the other of each pair of annular members over the outer peripheral surface of said one annular member of the pair, and an end portion of said elastic tube clamped between said projecting annular portion and said outer peripheral surface.

15. An arrangement as defined in claim 14, wherein said one annular member of each pair is formed by a plurality of separate ring sectors, and an annular spring holding said sectors together.

16. An arrangement as defined in claim 12, and including an additional conical ring sandwiched between said one annular member of each pair of annular members and the conical ring coordinated with said one annular member of each pair, and each end of said tube being clamped between the outer surface of the respective additional conical ring and the inner surface of the one annular member.

17. An arrangement as defined in claim 16, wherein each of said additional conical rings is formed by a plurality of ring sectors, and including an annular spring holding said sectors together.

18. An arrangement as defined in claim 9, wherein said shaft end portions are axially spaced from each other a given distance and wherein said rings, said annular members and said torque transmitting means are constructed and arranged to be mountable on and removable from said shaft end portions while maintaining the axial spacing of the latter.

References Cited

UNITED STATES PATENTS

| | | | |
|---|---|---|---|
| 1,748,486 | 2/1930 | Lord | 64—17 |
| 2,080,296 | 5/1937 | Wood | 64—17 |
| 2,478,890 | 8/1949 | Barager | 64—17 |
| 2,696,719 | 12/1954 | Sklar | 64—15 |
| 2,793,513 | 5/1957 | Anderson | 64—15 |
| 2,890,071 | 6/1959 | Johnson | 287—52.06 |
| 3,009,747 | 11/1961 | Pitzer | 287—52.09 X |
| 3,020,737 | 2/1962 | Firth | 64—11 |
| 3,232,076 | 2/1966 | Sundt | 64—11 |

HALL C. COE, *Primary Examiner.*

U.S. Cl. X.R.

64—11, 13, 14, 15, 17; 287—52.09, 129